United States Patent [19]
Ikemori et al.

[11] Patent Number: 5,392,082
[45] Date of Patent: Feb. 21, 1995

[54] PHOTOGRAPHING APPARATUS HAVING A TRIMMING PHOTOGRAPHIC MODE

[75] Inventors: Keiji Ikemori; Takeshi Koyama, both of Yokohama, Japan

[73] Assignee: Canon Kabushiki Kaisha, Tokyo, Japan

[21] Appl. No.: 236,147

[22] Filed: May 2, 1994

Related U.S. Application Data

[63] Continuation of Ser. No. 744,066, Aug. 12, 1991, abandoned.

[30] Foreign Application Priority Data

Apr. 14, 1990 [JP] Japan ............................ 2-214752
Apr. 14, 1990 [JP] Japan ............................ 2-214753

[51] Int. Cl.$^6$ .............................................. G03B 1/18
[52] U.S. Cl. ............................................... 354/195.12
[58] Field of Search ....................... 354/195.1–195.12; 359/683, 685

[56] References Cited

U.S. PATENT DOCUMENTS 5,075,707 12/1991 Ueyama ............................ 354/195.1
5,126,883 6/1992 Sato et al. ......................... 359/683

FOREIGN PATENT DOCUMENTS 54-26721 2/1979 Japan .
62-52541 3/1987 Japan .
63-285524 11/1988 Japan .

*Primary Examiner*—David M. Gray
*Attorney, Agent, or Firm*—Fitzpatrick, Cella, Harper & Scinto

[57] ABSTRACT

A photographing apparatus having at least two modes, i.e., a first mode for setting and photographing a first photographing area of a photographing area photographed by a photo-taking optical system, and a second mode for setting and photographing a second photographing area smaller than the first photographing area. The apparatus has in succession from the object side a first lens unit and a second lens unit. The first lens unit comprises a positive lens of positive refractive power and a negative lens of negative refractive power, and the second lens unit comprises a positive lens. The spacing between the first lens unit and the second lens unit is varied during the changeover between the first mode and the second mode.

7 Claims, 14 Drawing Sheets

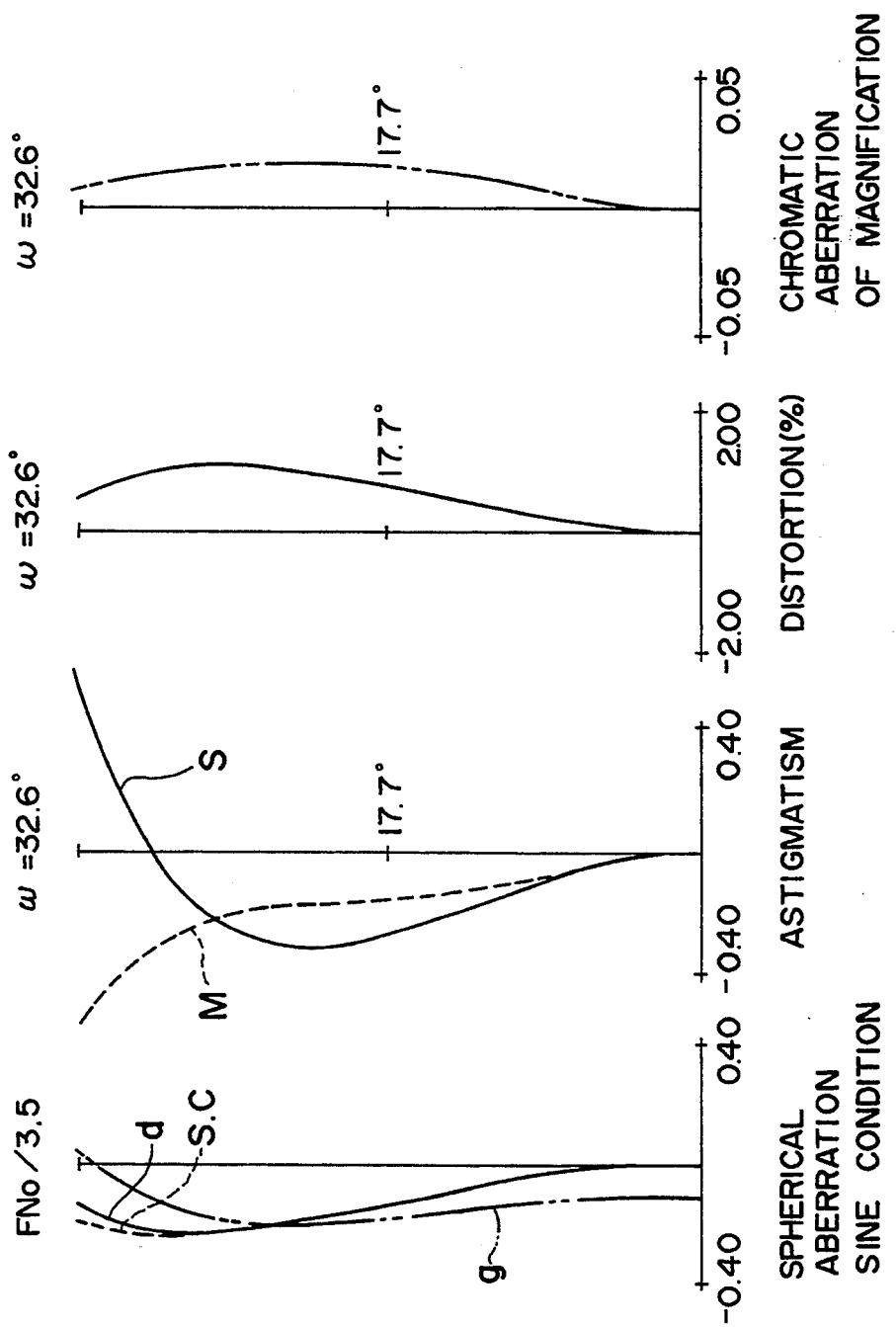

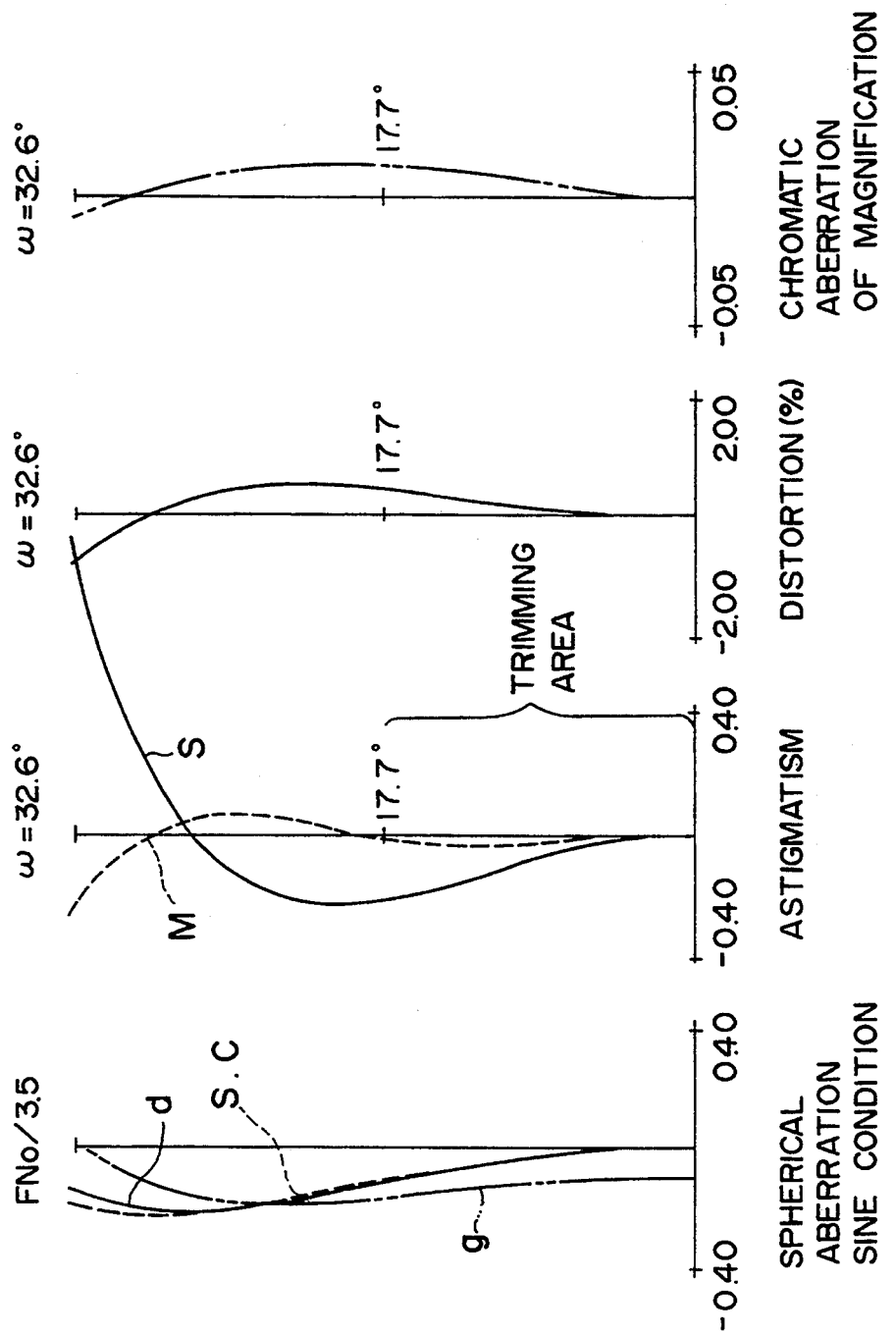

PHOTOGRAPHING APPARATUS HAVING A TRIMMING PHOTOGRAPHIC MODE

This application is a continuation of prior application Ser. No. 07/744,066, filed on Aug. 12, 1991, now abandoned.

BACKGROUND OF THE INVENTION

1. Field of the Invention

This invention relates to a photographing apparatus having a trimming photographing mechanism, and particularly to a photographing apparatus having a trimming photographing mechanism of simple construction which is designed such that images of good quality (for example, photographs) are obtained in photographing operation having at least two modes, i.e., normal photographing (a first mode directed to a normal photographing area) and trimming photographing (a second mode directed to a photographing area narrower than the photographing area of the first mode) by appropriately setting the lens construction of a photo-taking optical system.

2. Related Background Art

A photographing apparatus having a trimming photographing mechanism which is designed such that one of normal photographing and trimming photographing is changed over by a changeover mechanism and photographing is effected with the then photographing mode and trimmed area recognized both from the outside of a camera and within a finder view field has heretofore been proposed in Japanese Laid-Open Patent Application No. 62-52541 and Japanese Laid-Open Patent Application No. 63-285524.

Also, Japanese Laid-Open Patent Application No. 54-26721 proposes a photographing apparatus (camera) capable of accomplishing so-called trimming information writing which comprises recording, on film, image information indicative of the enlargement range set during photographing.

Generally, in the photo-taking lens of a photographic camera, a video camera or the like, aberrations are corrected so that an optical performance of good balance may be obtained over the entire picture plane.

As the tendency of aberration correction in ordinary photo-taking lenses, the best image plane position indicative of curvature of image field is designed to incline toward the under-corrected (minus) side from the center of the photographing range (the optic axis) toward the marginal portion of the picture plane, thereafter return to the over-corrected (plus) side and lie on the more or less over-corrected (plus) side in the most marginal portion of the picture plane.

Thereby there is obtained an image of good quality which is well balanced over the entire picture plane. Design is also made such that when the ordinary enlargement of the entire picture plane is effected, there is obtained a good image (photograph) in which the deterioration of quality hardly weights on the photographer's mind.

There is a case where trimming is effected on an image, which is photographed by the use of a photo-taking lens of this kind, and an image of a photographing area (trimming area) narrow as compared with the ordinary photographing area is enlarged and printed.

In such case, in the most marginal portion of the picture plane of the image within the trimming area, the best image plane position greatly inclines toward the minus side and thus, the optical performance of the marginal portion of the picture plane is greatly reduced as compared with that of the central portion. This has led to the problem that the balance of the image quality of the entire trimming picture plane is greatly broken.

That is, there has been the problem that when an image is obtained by enlarging the trimming area in which aberrations are under-corrected over the entire picture plane, the deterioration of image quality becomes remarkable and the obtained image becomes a very unsightly image (photograph).

SUMMARY OF THE INVENTION

In order to solve the above-noted problems, it is an object of the present invention to provide a compact photographing apparatus having a trimming photographing mechanism in which the lens construction of a photo-taking lens is set appropriately and the spacing between lens units constituting said photo-taking lens is regulated during trimming photographing, whereby a good image (photograph) is obtained both during normal photographing and during trimming photographing when photographing is variously effected with an area narrower than the photographing area during normal photographing as the subject.

It is another object of the present invention to provide a photographing apparatus having a trimming photographing mechanism which has at least two modes, i.e., a first mode for setting and photographing a first photographing area of photographing ranges photographed by a photo-taking optical system and a second mode for setting and photographing a second photographing area smaller than said first photographing area and in which said photo-taking optical system has, in succession from the object side, a first lens unit and a second lens unit, said first lens unit having a positive lens of positive refractive power and a negative lens of negative refractive power, said second lens unit having a positive lens, and the spacing between said first lens unit and said second lens unit is relatively varied during the changeover between said first mode and said second mode.

It is still another object of the present invention to provide a photographing apparatus having a trimming photographing mechanism in which the second lens unit has a cemented lens comprising a positive lens of positive refractive power and a negative lens of negative refractive power cemented together and the spacing between said first lens unit and said second lens unit is relatively varied during the changeover between said first mode and said second mode to thereby obtain a good quality of image.

BRIEF DESCRIPTION OF THE DRAWINGS

FIGS. 2, 6 and 9 show various aberrations in numerical value embodiments 1, 2 and 3, respectively, of the photo-taking lens during normal photographing.

FIGS. 3, 7 and 10 show various aberrations in numerical value embodiments 1, 2 and 3, respectively, of the photo-taking lens during trimming photographing.

DETAILED DESCRIPTION OF THE PREFERRED EMBODIMENTS

Figure 1:
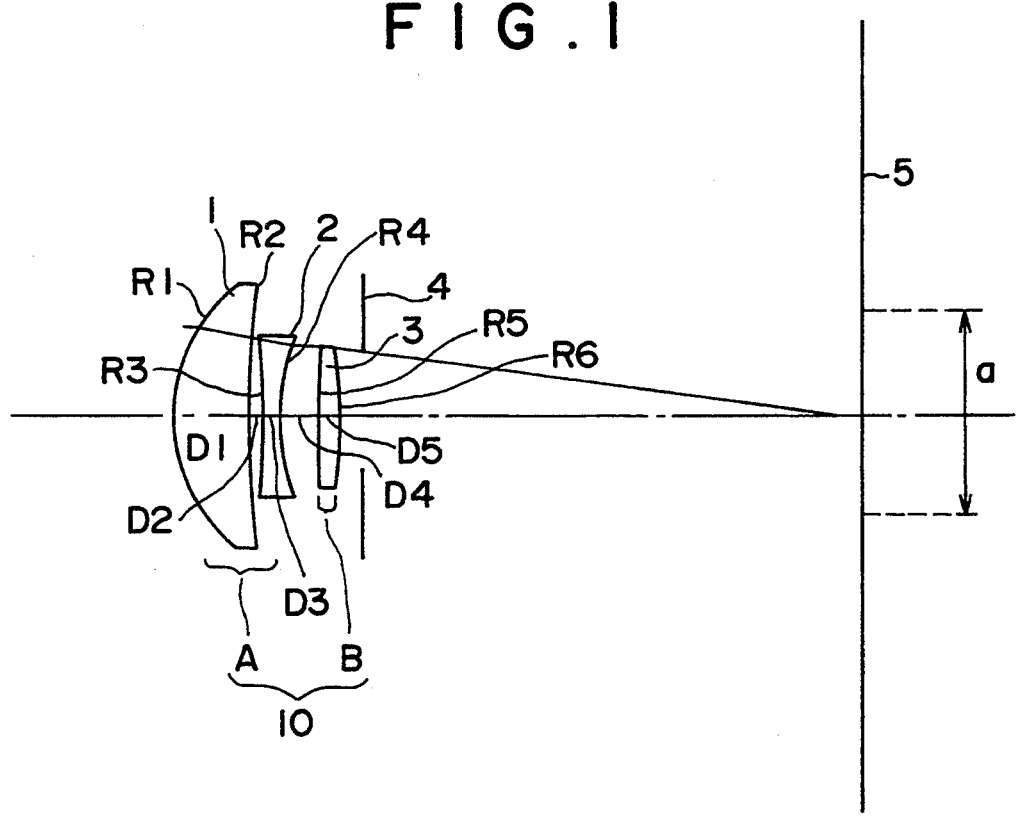
FIGS. 1, 5 and 8 are lens cross-sectional views of numerical value embodiments 1, 2 and 3, respectively, of a photo-taking lens according to the present invention.

FIG. 1 is a lens cross-sectional view of numerical value embodiment 1 of a photo-taking lens according to the present invention which will be described later.

In FIG. 1, the reference numeral 10 designates a photo-taking optical system (also called a photo-taking lens) comprising in succession from the object side a first lens unit A comprising a positive lens 1 of positive refractive power and a negative lens 2 of negative refractive power, and a second lens unit B comprising a single positive lens 3 of positive refractive power, thus three lenses in total. The reference numeral 4 denotes a stop disposed rearwardly of the second lens unit B. The reference numeral 5 designates film disposed on the imaging plane.

Figure 2:
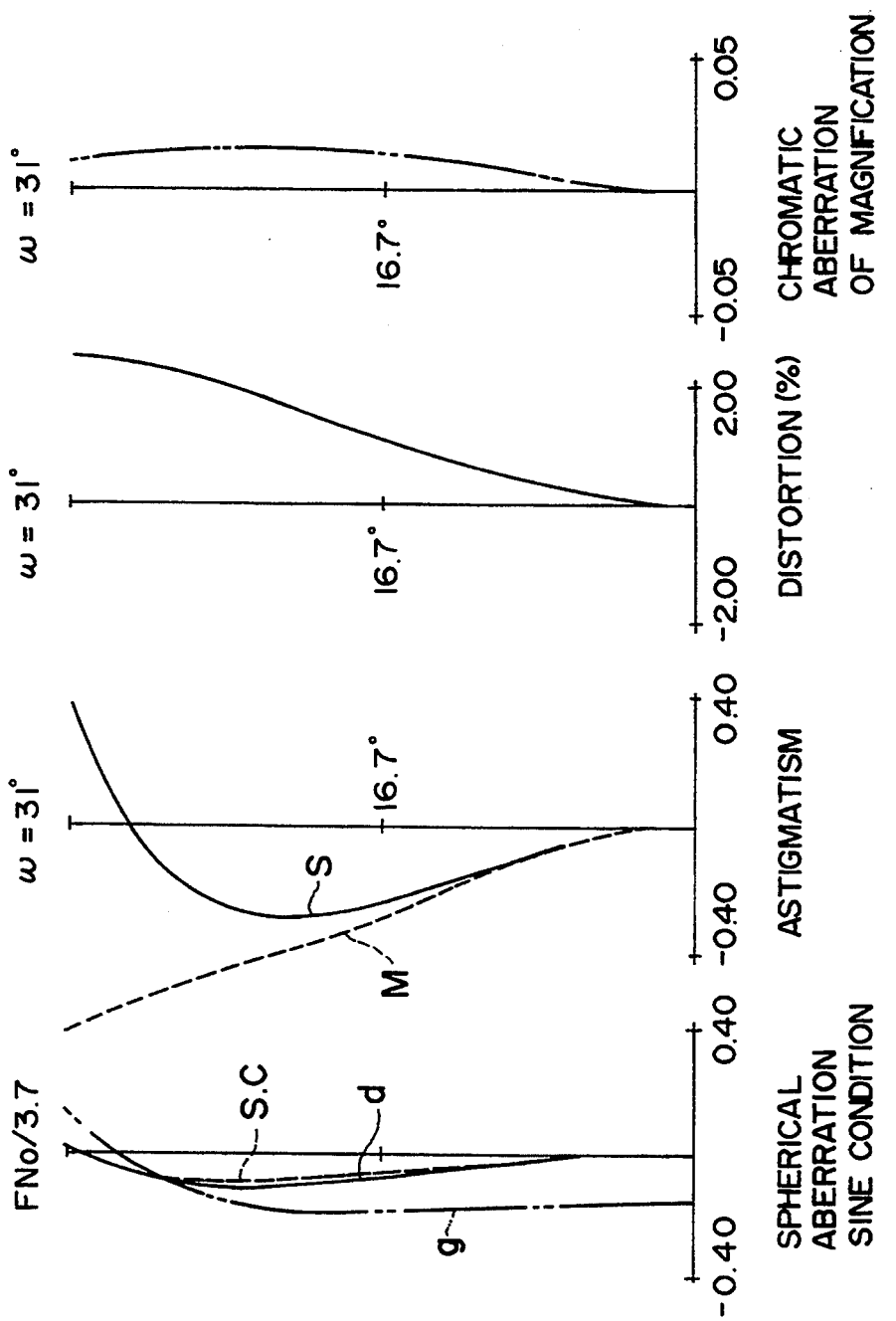

FIG. 2 shows various aberrations in the photo-taking lens of FIG. 1 during normal photographing ( a first mode ).

In the present embodiment, the aberrations in the photo-taking lens 10 during normal photographing are well-balancedly corrected over the entire effective picture plane area (the photographing angle of view 2 $\omega=62°$) of the film 5 disposed on the imaging plane, as shown in FIG. 2.

Thus, during normal photographing, there is obtained a good image (photograph) well balanced over the entire effective picture plane area of the film 5.

Next, let it be assumed that when photographing is to be effected with a second mode directed to a photographing area a narrower than that of the first mode, i.e., a trimming area a (the photographing angle of view 2 $\omega=33.4°$), being designated as shown in FIG. 1, photographing has been effected while being changed over to trimming photographing in the aberration corrected state shown in FIG. 2.

At this time, the curvature of image field in the most marginal portion or the picture plane of the trimming area a ($\omega=16.7°$) is in the most under-corrected state (which corresponds to being positioned in the most protruded region of the aberration curve) as shown in FIG. 2.

Therefore, if printing is effected with the narrow trimming area a being enlarged to a size equal to the normal photographing area by automatic development and printing, the resultant image will become an image (photograph) much deteriorated in quality of image. So, in the present embodiment, the fact that (X) generally during trimming photographing, the desired photographing angle of view differs from that during normal photographing and aberration correction need not be considered over the entire angle of view but the angle of view within only the trimming area should be considered and (Y) further in this trimming photographing area, when the enlargement magnification thereof is considered, it is desirable to effect aberration correction better than when normal photographing is taken into account, and when trimming photographing is to be effected, the spacing between the first lens unit A and the second lens unit B, which constitute the photo-taking optical system 10, is relatively varied, for example, enlarged (in the present embodiment, the spacing between the first and second lens units A and B is enlarged from 2.02 to 2.52, i.e., by 0.5, as shown in numerical value embodiment 1 to be described before (during normal photographing) and after (during trimming photographing) said spacing is varied), whereby aberration correction is accomplished best-balancedly within the trimming photographing range. Thereby, an image (photograph) of good quality is obtained within the trimming photographing area.

Figure 3:
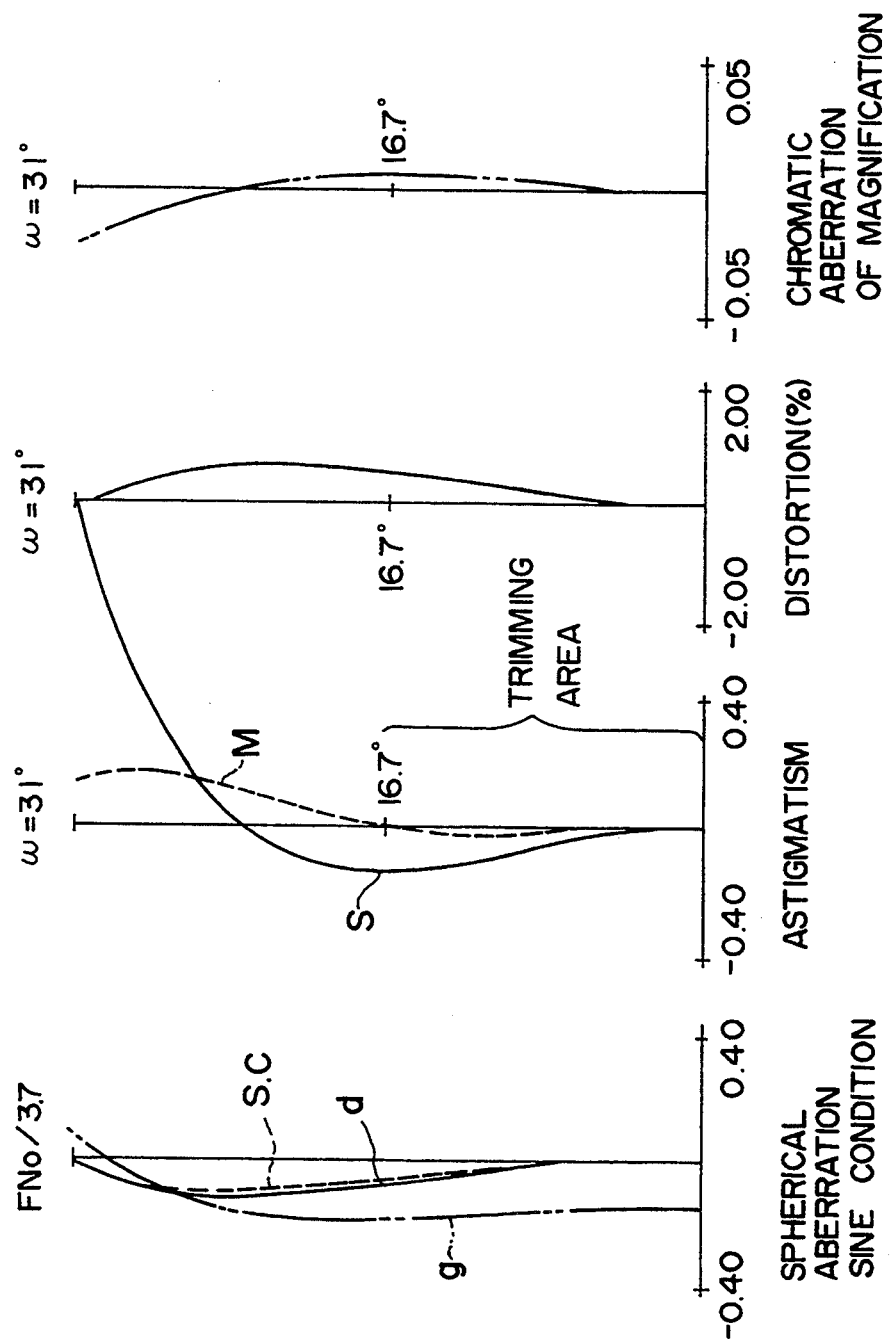

FIG. 3 is an aberration graph showing a state in which the correction of various aberrations has been effected with the trimming photographing area during the then trimming photographing as the subject.

As shown in FIG. 3, at the same angle of view (the half angle of view $\omega=31°$) of the most marginal portion of the picture plane as that during normal photographing shown in FIG. 2, curvature of image field (the average value of the meridional image plane M and the sagittal image plane S) is greatly over-corrected. Let it be assumed that in this state, for example, the photographing picture plane is trimmed to one half (the area ratio $\frac{1}{2}$) and the photographing angle of view is $\omega=16.7°$. Then, the curvature of image field in the most marginal portion of the picture plane ($\omega=16.7°$) during trimming photographing becomes good as compared with that in the case of normal photographing (a half angle of view $\omega=31°$). Also, distortion and chromatic aberration of magnification become good as shown in FIG. 3, as compared with a case where the spacing between the lens units is not regulated.

Particularly, chromatic aberration of magnification, like curvature of image field, is exaggerated by trimming, but as compared with the area during normal photographing, aberration correction is done well within the trimming area and therefore, a good quality of image will be obtained even if the picture plane is greatly enlarged.

In the present embodiment v to prevent the movement of focus when the spacing between the first lens unit A and the second lens unit B is varied, it is desirable to design the photo-taking optical system such that the light beam emerging from the first lens unit A becomes a substantially afocal light beam.

Also, in the present embodiment, to obtain an image of good quality during trimming photographing, it is preferable to satisfy the following condition:

$$|f1/fA| \geq 2, \quad (1)$$

where f1 is the focal length f1 of the first lens unit A, and fA is the focal length of the photo-taking optical system during normal photographing.

The conditional expression (1) relates to the ratio between the focal length of the first lens unit A and the focal length of the photo-taking optical system during normal photographing, and if the condition (1) is departed from, the fluctuation of spherical aberration will increase when trimming photographing is effected with the spacing between the first lens unit A and the second lens unit B enlarged, and further the amount of variation in the back focal length will also increase, and this is not preferable.

When in the present embodiment, the amount of variation in the back focal length is sufficiently small, various aberrations can be well-balancedly corrected within the trimming photographing range even if during trimming photographing, only the first lens unit A is moved relative to the film surface (the imaging plane) to thereby vary the spacing between the lens units. According to this, the mechanism can also be very much simplified.

In the present embodiment, as previously described, the photo-taking optical system is comprised of three lenses, and during trimming photographing, the spacing between the first lens unit A and the second lens unit B is relatively varied to thereby effect the most preferable correction of aberrations within the trimming photographing area, whereby the pseudo-telephoto caused by trimming photographing can be obtained very inexpensively and with a good performance.

The control when trimming photographing is effected in the present embodiment will now be described with reference to the block diagram of FIG. 4.

Figure 4:
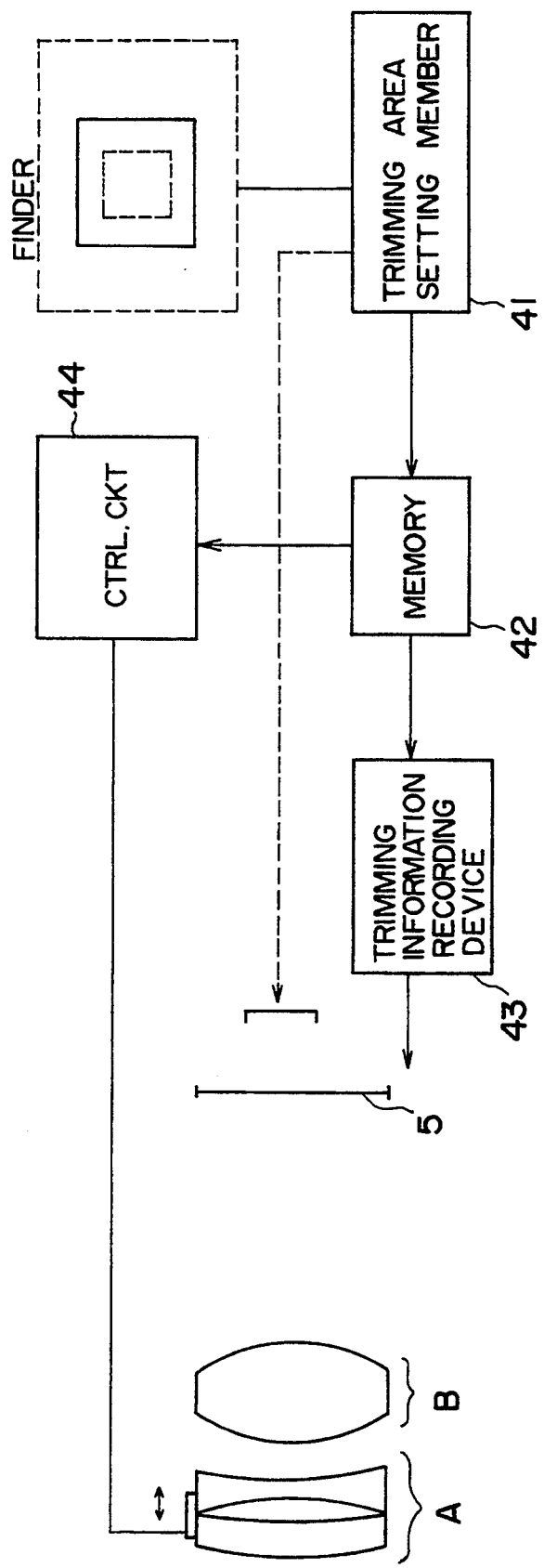
FIG. 4 is a block diagram when trimming photographing is effected.

In FIG. 4, the reference numeral 41 designates a trimming area setting member operable by the photographer to set a plurality of trimming photographing areas, and in response to the operation of this setting member 41, the trimming photographing area in the finder formed, for example, of liquid crystal or the like varies.

The determined trimming photographing area is converted into an electrical signal and the information thereof is stored in a memory device 42. A trimming information recording device 43 effects imprinting onto the film 5 on the basis of the information stored in the memory device 42 and a predetermined standard by the utilization of optical means.

Also, before photographing, a control circuit 44 effects aberration correction within the trimming photographing area on the basis of the information regarding the trimming photographing area stored in the memory device 42. That is, the first lens unit A is moved in a direction to enlarge the spacing between the two lens units A and B as indicated by arrow in FIG. 4. In this manner, control is performed when trimming photographing is effected.

Of course, it is also possible to move the first lens unit A in response to the trimming area setting member 41.

Also, in FIG. 4, there is shown the case where only the first lens unit A is moved for aberration correction within the trimming area when trimming photographing is effected, but of course, only the second lens unit B or both of the first lens unit A and the second lens unit B may be moved to vary, for example, by enlarging the spacing between the lens units.

The stop 4 may be constructed integrally with and moved with one of the first lens unit A and the second lens unit B, or may be independently constructed. Also, any of the intermediate stop type, which is disposed between the two lens units A and B, and the rearward stop the which is disposed rearwardly of the second lens unit B as shown in the first embodiment may be adopted as the stop.

Figure 5:
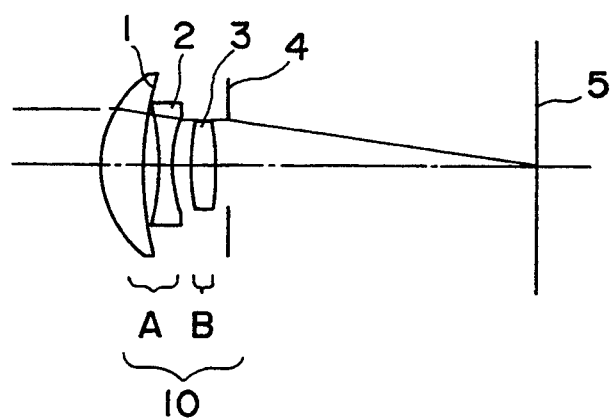
Figure 8:
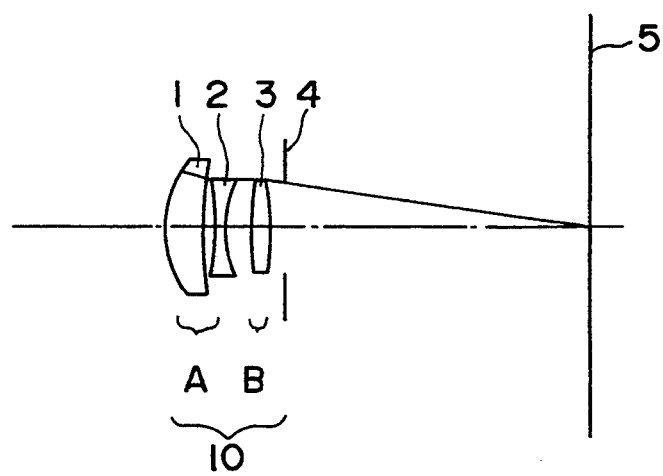

FIGS. 5 and 8 are lens cross-sectional views of numerical value embodiments 2 and 3, respectively, of the photo-taking lens according to the present invention which will be described later.

Figure 6:
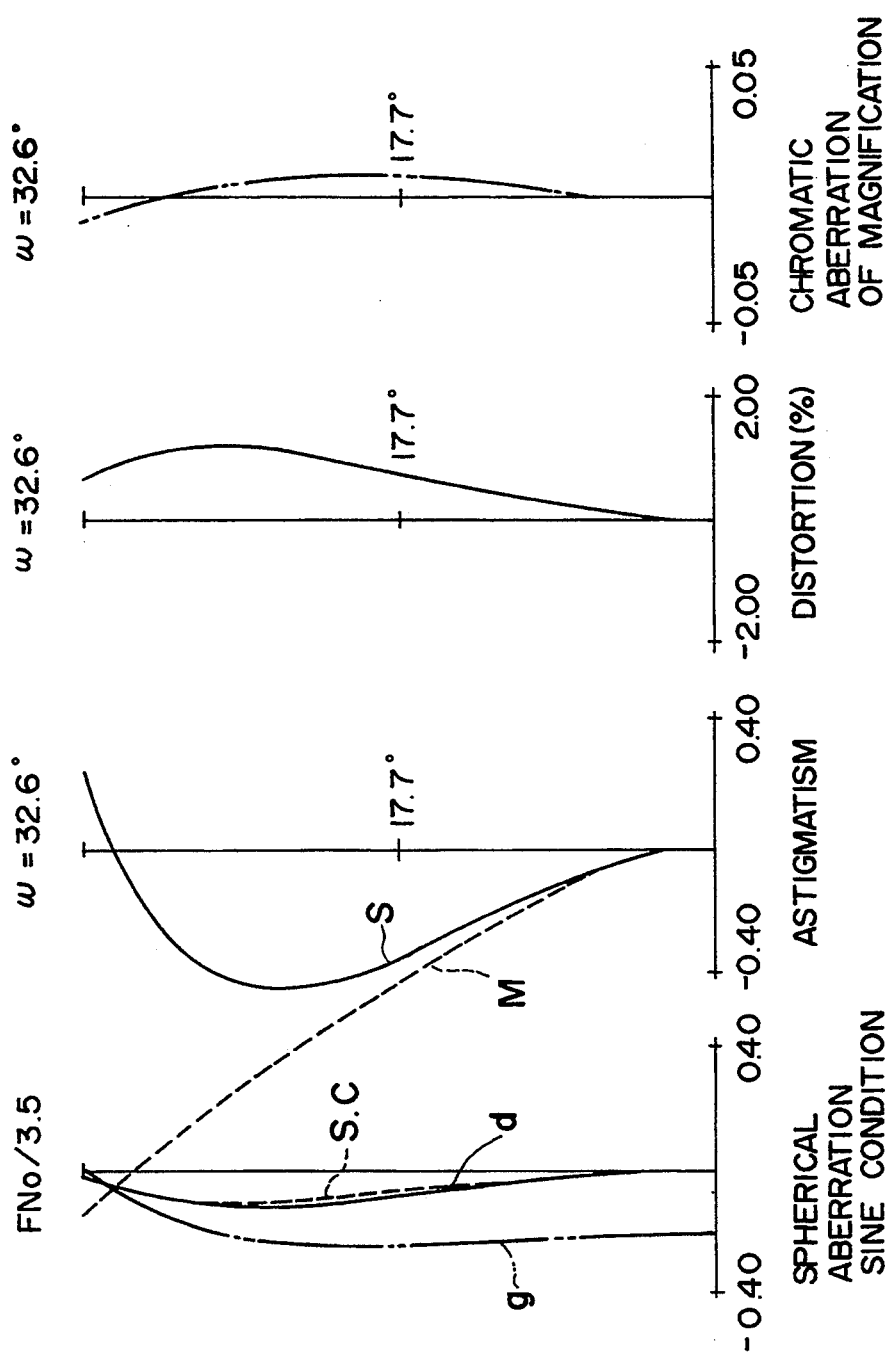
Figure 7:
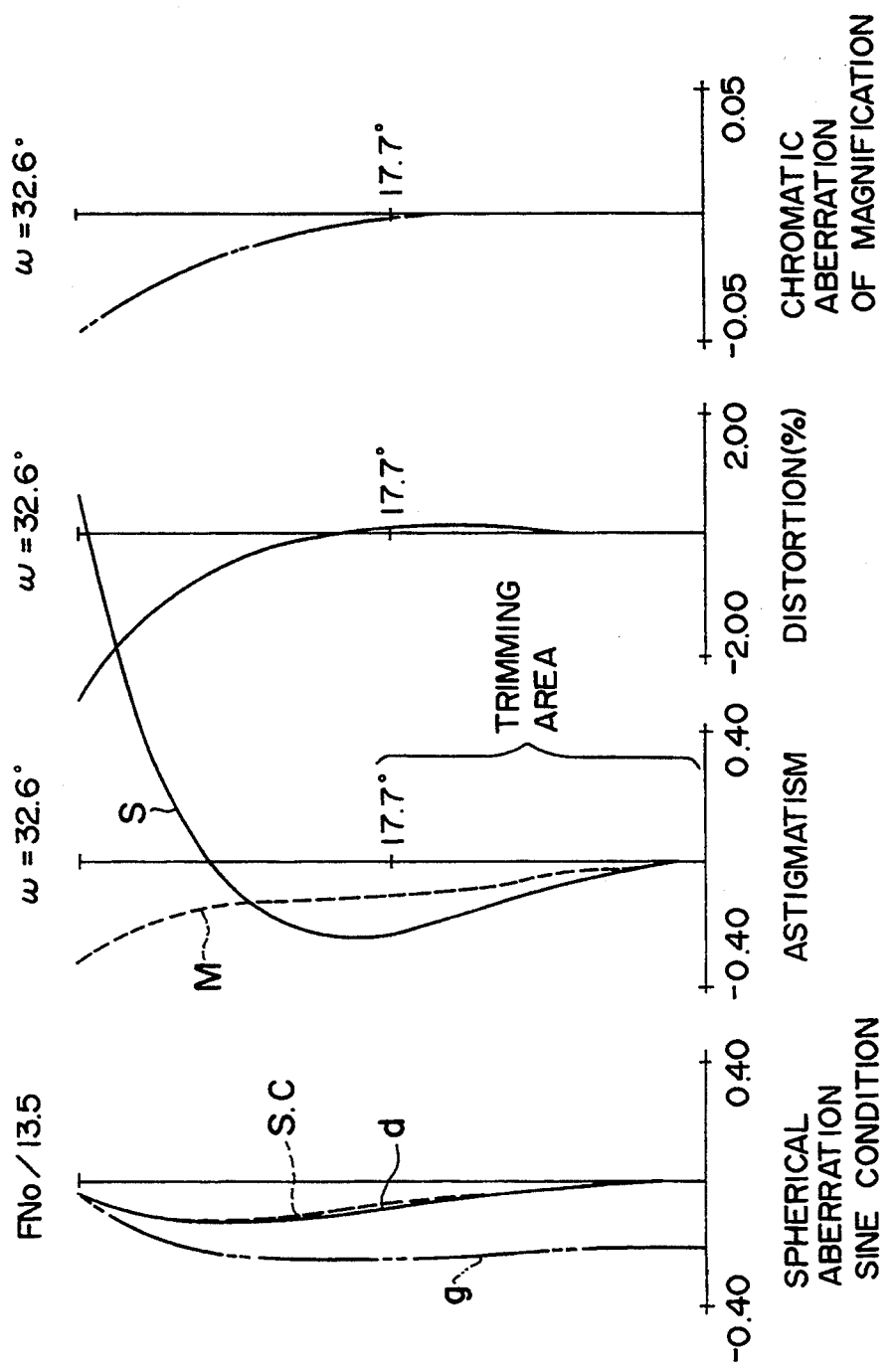

FIGS. 6 and 9 show various aberrations in numerical value embodiments 2 and 3, respectively, of the photo-taking lens of the present invention during normal photographing, and FIGS. 7 and 10 show various aberrations in numerical value embodiments 2 and 3, respectively, of the photo-taking lens of the present invention during trimming photographing.

In any of these embodiments, as in the aforedescribed first embodiment, during trimming photographing, the spacing between the first lens unit A and the second lens unit B is varied in a direction to relatively widen, whereby various aberrations including, for example, curvature of image field, etc. are well-balancedly correlated within the trimming area, whereby the pseudo-telephoto effect by trimming photographing can be obtained with a good performance.

While each embodiment has been shown with respect to two modes, i.e., normal photographing (the first mode) and trimming photographing (the second mode), changeover may be further made, for example, third and fourth modes which are smaller in the imaging area (the photographing area) than the second mode to thereby designate trimming photographing.

Also, the above embodiments have been shown with respect to a single lens, but alternatively, the photo-taking optical system may be constituted by a zoom lens, and again in this case, if the spacing between the first lens unit A and the second lens unit B, for example, in the relay lens system is relatively appropriately varied when trimming photographing is effected, good trimming photographing can be accomplished as previously described.

The numerical value embodiments of the present invention will be shown below. In the numerical value embodiments below, Ri represents the radius of curvature of the ith lens surface from the object side, Di represents the thickness and air space of the ith lens from the object side, and Ni and $\nu i$ represent the refractive index and the Abbe number, respectively, of the glass of the ith lens from the object side.

| Numerical Value Embodiment 1 | | | |
|---|---|---|---|
| f = 36.0 | FNO = 1:3.7 | 2ω = 62° | b · f = 27.28 |
| R1 = 10.29 | D1 = 3.60 | N1 = 1.78650 | ν1 = 50.0 |
| R2 = 33.90 | D2 = 0.80 | | |
| R3 = −69.01 | D3 = 0.80 | N2 = 1.68893 | ν2 = 31.1 |
| R4 = 9.54 | D4 = 2.02 | | |
| R5 = 56.47 | D5 = 1.21 | N3 = 1.80610 | ν3 = 40.9 |
| R6 = −26.85 | D6 = 1.21 | | |
| R7 = stop | | | |
| During Trimming Photographing | | | |
| f = 35.88 | | D4 = 2.52 | |
| 2ω = 33.4° | | FNO = 1:3.7 | |
| | | b · f = 27.25 | |
| \|f1/fA\| = 3.79 | | | |

| Numerical Value Embodiment 2 | | | |
|---|---|---|---|
| f = 34.0 | FNO = 1:3.5 | 2ω = 65.2° | b · f = 25.81 |
| R1 = 10.78 | D1 = 3.59 | N1 = 1.78650 | ν1 = 50.0 |
| R2 = 33.60 | D2 = 0.87 | | |
| R3 = −55.86 | D3 = 1.01 | N2 = 1.68893 | ν2 = 31.1 |
| R4 = 10.32 | D4 = 1.95 | | |
| R5 = 47.12 | D5 = 1.79 | N3 = 1.80610 | ν3 = 40.9 |
| R6 = −25.77 | D6 = 1.21 | | |
| R7 = stop | | | |
| During Trimming Photographing | | | |
| f = 33.75 | | D4 = 2.45 | |
| 2ω = 35.4° | | FNO = 1:3.5 | |
| | | b · f = 25.77 | |
| \|f1/fA\| = 3.22 | | | |

| Numerical Value Embodiment 3 | | | |
|---|---|---|---|
| f = 34.0 | FNO = 1:3.5 | 2ω = 65.2° | b · f = 25.77 |
| R1 = 10.08 | D1 = 3.11 | N1 = 1.84100 | ν1 = 43.2 |
| R2 = 30.77 | D2 = 0.85 | | |
| R3 = −85.57 | D3 = 0.80 | N2 = 1.72825 | ν2 = 28.5 |
| R4 = 9.53 | D4 = 2.18 | | |
| R5 = 44.30 | D5 = 1.60 | N3 = 1.72000 | ν3 = 43.7 |

-continued

```
R6 = −24.49    D6 = 1.20
R7 = stop
During Trimming Photographing
    f = 33.9              D4 = 2.40
    2ω = 35.4°            FNO = 1:3.5
                          b · f = 25.76
    |f1/fA| = 4.33
```

Figure 11:
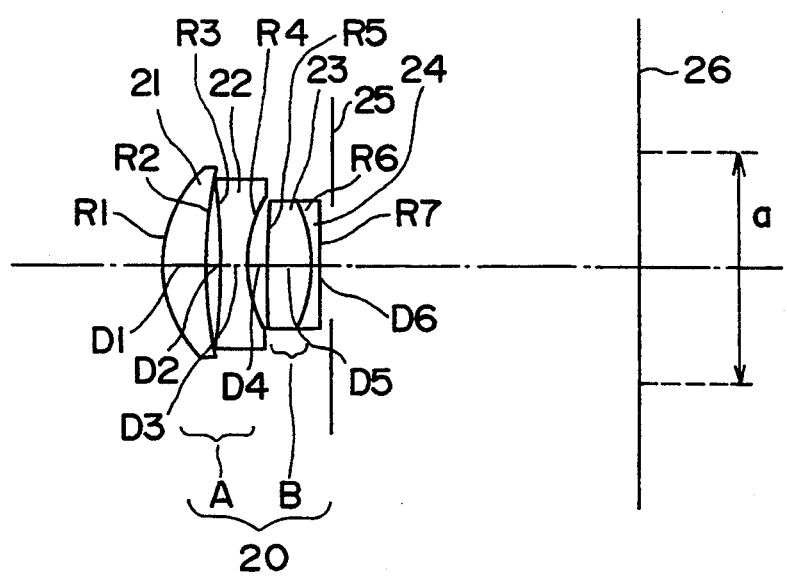
FIGS. 11 and 14 are lens cross-sectional views of numerical value embodiments 4 and 5, respectively, of the photo-taking lens.

FIG. 11 shows another embodiment in which the F number of the photo-taking lens in the above-described embodiments is made still smaller.

In FIG. 11, the reference numeral 20 designates a photo-taking optical system (also called as a photo-taking lens) comprised, in succession from the object side, of a first lens unit A comprising a positive lens 21 of positive refractive power and a negative lens 22 of negative refractive power, and a second lens unit B comprising a cemented lens comprising a positive lens 23 of positive refractive power and a negative lens 24 of negative refractive power, i.e., four lenses in total. The reference numeral 25 denotes a stop disposed rearwardly of the second lens unit B. The reference numeral 26 designates film disposed on the imaging plane.

Figure 12:
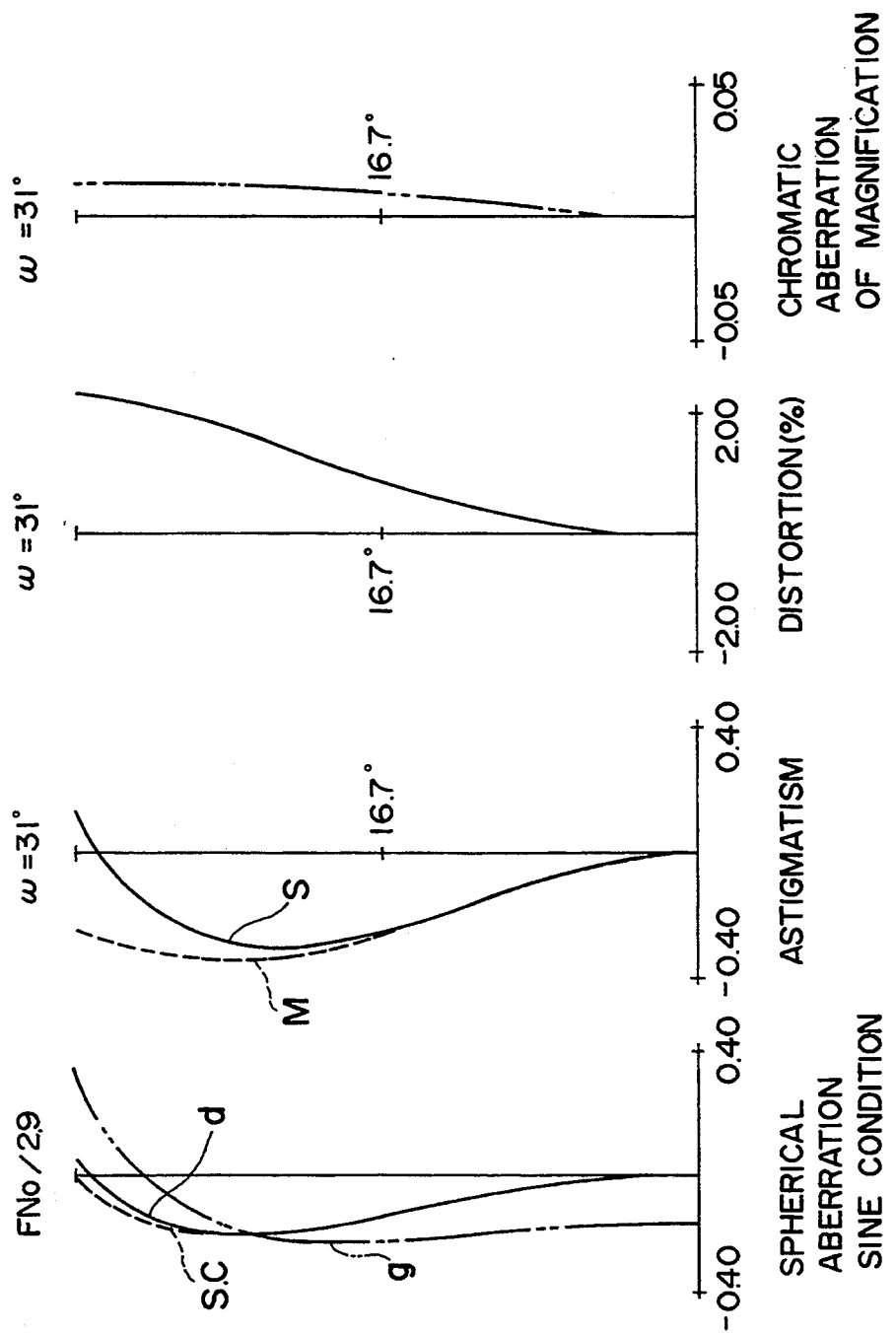
FIGS. 12 and 15 show various aberrations in numerical value embodiments 4 and 5, respectively, of the photo-taking lens during normal photographing.
Figure 13:
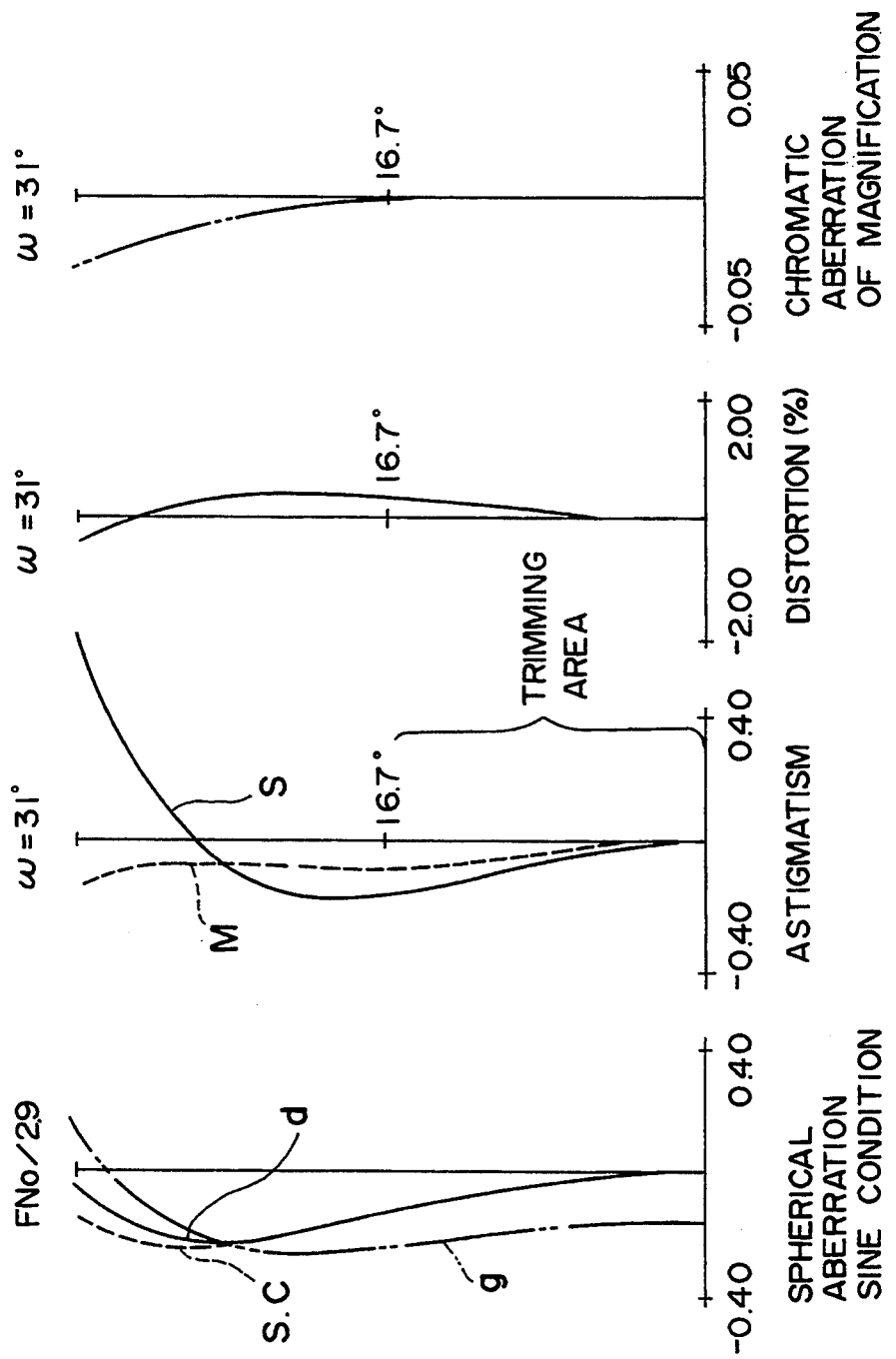
FIGS. 13 and 16 show various aberrations in numerical value embodiments 4 and 5, respectively, of the photo-taking lens during trimming photographing.

FIG. 12 shows various aberrations in the photo-taking lens of FIG. 11 during normal photographing (a first mode). The aberrations are well-balancedly corrected over the entire effective picture plane area (the photographing angle of view 2 ω=62°) of the film 26 disposed on the imaging plane, as shown in FIG. 12.

Thereby, during normal photographing, there is obtained a good image (photograph) well balanced over the entire effective picture plane area of the film 26.

Let it now be assumed that in a second mode directed to a photographing area a narrower than that of the first mode, that is, when photographing is to be effected with a trimming area a (the photographing angle of view 2 ω=33.4°) designated as shown in FIG. 11, photographing has been effected while being changed over to trimming photographing in the aberration correction state shown in FIG. 12.

At this time, the curvature of image field in the most marginal portion of the picture plane (ω=16.7°) of the trimming area a is in the most under-corrected state (which corresponds to being positioned at the most protruded region of the aberration curve) as shown in FIG. 12.

Therefore, with the above-described points (X) and (Y) taken into account, when trimming photographing is to be effected, the spacing between the first lens unit A and the second lens unit B which constitute the photo-taking optical system 20 is relatively varied, for example, enlarged (in the present embodiment, as shown in numerical value embodiment 4 to be described, the spacing between the first and second lens units A and B is enlarged from 1.47 to 2.0, i.e., by 0.53, before (during normal photographing) and after (during trimming photographing) said spacing is varied), whereby aberration correction is best-balancedly done within the trimming photographing area. Thereby, an image (photograph) of good quality is obtained with the trimming photographing area.

Thus, in the present embodiment, there is achieved a photographing apparatus in which as previously described, the photo-taking optical system is comprised of four lenses and during trimming photographing, the spacing between the first lens unit A and the second lens unit B is relatively varied to thereby effect the most preferable correction of aberrations within the trimming photographing area, whereby the pseudo-telephoto effect by trimming photographing can be obtained very inexpensively and with a good performance and moreover which has a trimming photographing mechanism of a great relative aperture of F-number 3 or less. Also, in designing the lens, it is desirable to take the conditional expression (1) into account.

Further, in the present embodiment, the cemented lens constituting the second lens unit comprises, in succession from the object side, a positive lens and a negative lens, but alternatively, may comprise, in succession from the object side, a negative lens and a positive lens.

Figure 14:
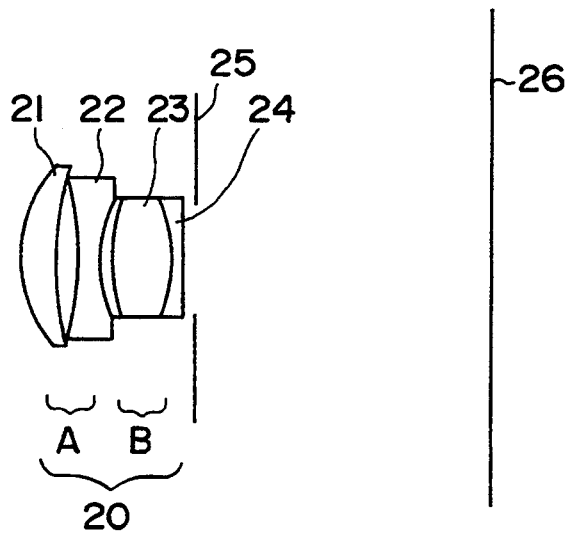

FIG. 14 is a lens cross-sectional view of numerical value embodiment 5 of the photo-taking lens according to the present invention which will be described later.

Figure 15:
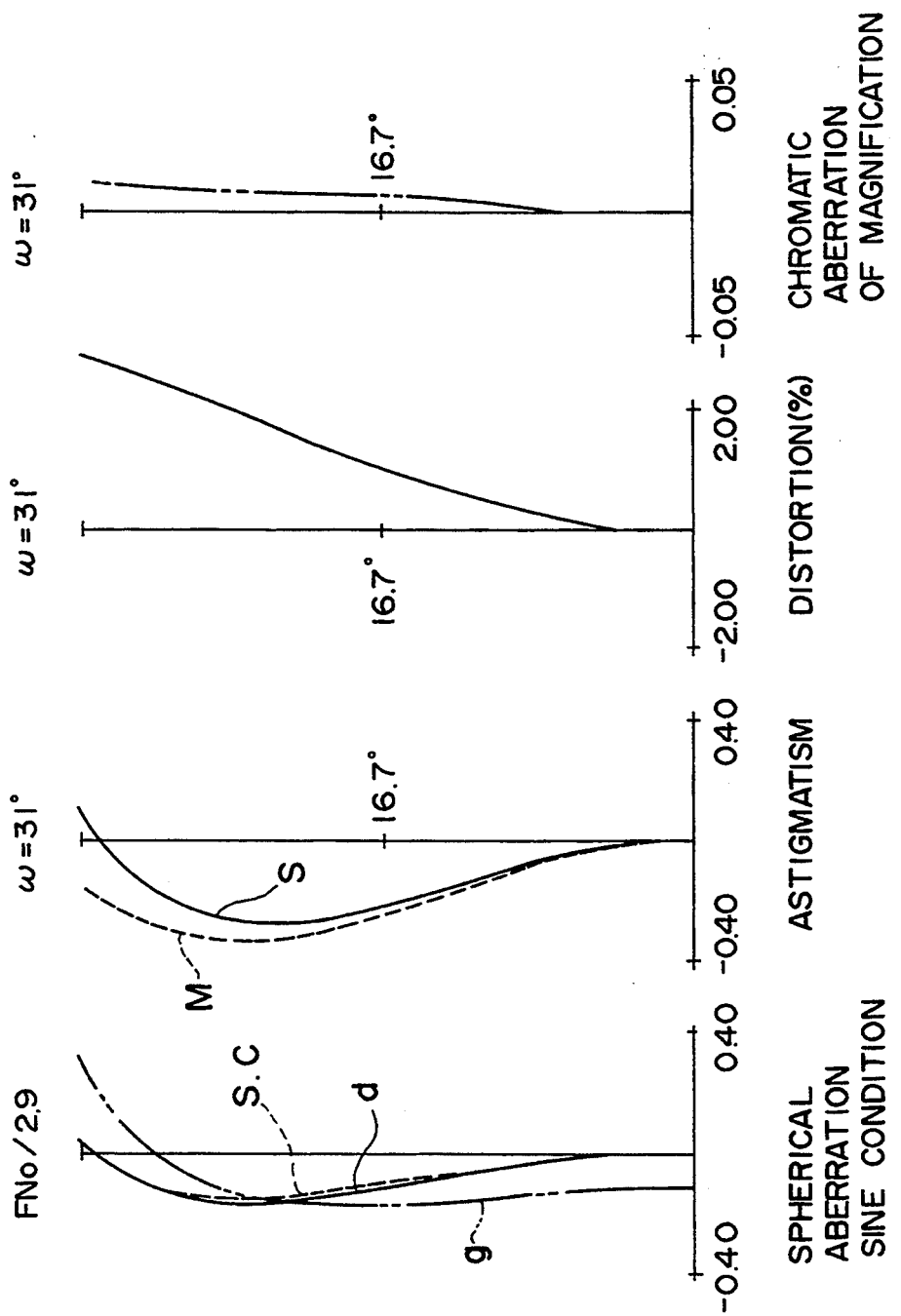
Figure 16:
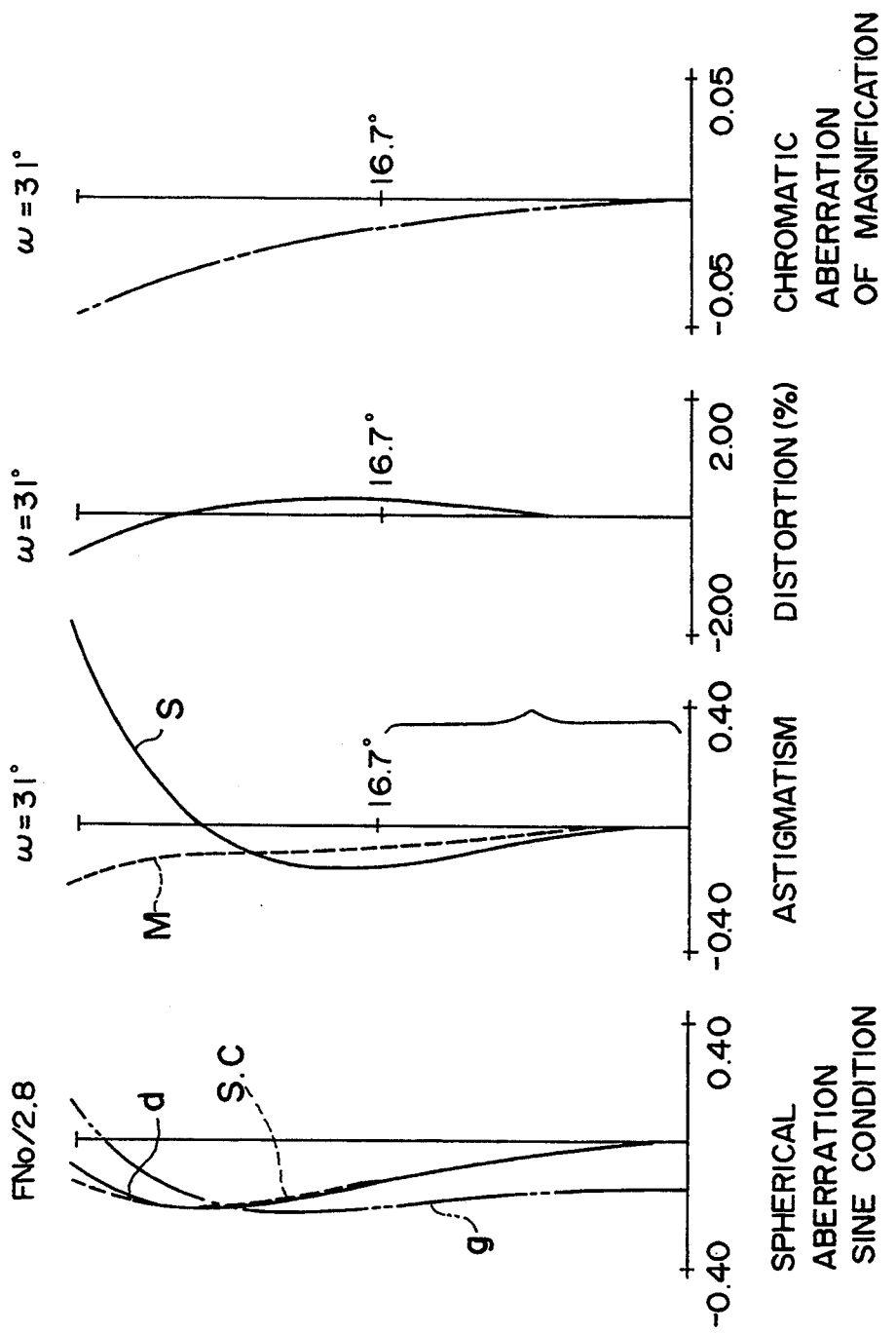

FIG. 15 shows various aberrations in numerical value embodiment 5 of the photo-taking lens of the present invention during normal photographing, and FIG. 16 shows various aberrations in numerical value embodiment 5 of the photo-taking lens of the present invention during trimming photographing.

Numerical value embodiments will be shown below. In the numerical value embodiments below, Ri represents the radius of curvature of the ith lens surface from the object side, Di represents the thickness and air space of the ith lens from the object side, and Ni and νi represent the refractive index and the Abbe number, respectively, of the glass of the ith lens from the object side.

```
Numerical Value Embodiment 5
f = 36.20      FNO = 1:2.9      2ω = 62°       b · f = 25.71
    R1 = 12.27       D1 = 3.13      N1 = 1.88300   ν1 = 40.8
    R2 = 38.22       D2 = 1.14
    R3 = −147.33     D3 = 2.09      N2 = 1.80518   ν2 = 25.4
    R4 = 10.79       D4 = 1.32
    R5 = 29.87       D5 = 5.00      N3 = 1.83400   ν3 = 37.2
    R6 = −13.62      D6 = 0.76      N4 = 1.58144   ν4 = 40.8
    R7 = −208.40     D7 = 0.95
    R8 = stop
During Trimming Photographing
    f = 35.78                       D4 = 2.0
    2ω = 33.4°                      FNO = 1:2.9
                                    b · f = 25.62
    |f1/fA| = −2.74
```

```
Numerical Value Embodiment 4
f = 36.20      FNO = 1:2.9      2ω = 62°       b · f = 20.06
    R1 = 12.73       D1 = 3.30      N1 = 1.88300   ν1 = 40.8
    R2 = 39.32       D2 = 1.20
    R3 = −101.44     D3 = 2.20      N2 = 1.80518   ν2 = 25.4
    R4 = 11.54       D4 = 1.47
    R5 = 31.68       D5 = 3.93      N3 = 1.83400   ν3 = 37.2
    R6 = −13.89      D6 = 0.80      N4 = 1.58144   ν3 = 40.8
    R7 = −121.68     D7 = 1.00
    R8 = stop
During Trimming Photographing
    f = 35.86                       D4 = 2.00
    2ω = 33.4°                      FNO = 1:2.9
                                    b · f = 26.00
    |f1/fA| = −2.67
```

According to the present invention, there can be achieved a photographing apparatus having a trimming photographing mechanism capable of trimming photographing in which, a photo-taking optical system, the spacing between a first lens unit and a second lens unit, which comprise predetermined lenses, is relatively varied during trimming photographing, whereby various aberrations within the trimming photographing area, for example, various aberrations such as curvature of image field, etc., is well-balancedly corrected and an image of good quality is obtained over the entire picture plane.

What is claimed is:

1. An image forming apparatus having at least two modes, comprising:
   means for setting a first mode for photographing a first photographing area of an image plane of a photo-taking optical system; and
   means for setting a trimming mode for photographing a second photographing area of the image plane of the photo-taking optical system, said second photographing area being smaller than said first photographing area, said photo-taking optical system having in succession from the object side a first lens unit and a second unit, said first lens unit comprising a positive lens of positive refractive power and a negative lens of negative refractive power, said second lens unit consisting of a single positive lens, the spacing between said first lens unit and said second lens unit being varied during the changeover between said first mode and said trimming mode.

2. A photographing apparatus according to claim 1, satisfying the following condition:

$$|f1/fA| \geq 2,$$

where f1 and fA are the focal lengths of said first lens unit and said photo-taking optical system during said first mode, respectively.

3. An image forming apparatus having at least two modes, comprising:
   means for setting a first mode for photographing a first photographing area of an image plane of a photo-optical system; and
   means for setting a trimming mode for photographing a second photographing area of the image plane of the photo-taking optical system, said second photographing area being smaller than said first photographing area, said photo-taking optical system having in succession from the object side a first lens unit and a second lens unit, said first lens unit comprising a positive lens of positive refractive power and a negative lens of negative refractive power, said second lens unit consisting of a cemented lens comprising a positive lens of positive refractive power and a negative lens of negative refractive power cemented together, the spacing between said first lens unit and said second lens unit being varied during the changeover between said first mode and said trimming mode.

4. A photographing apparatus according to claim 3, satisfying the following condition:

$$|f1/fA| \geq 2,$$

where f1 and fA are the focal lengths of said first lens unit and said photo-taking optical system during said first mode, respectively.

5. An image forming apparatus having at least two modes, comprising:
   means for setting a first mode for a first photo-taking area of an image plane of a photo-taking optical system; and
   means for setting a trimming mode for a second photo-taking area of the image plane of the photo-taking optical system, said second photo-taking area being smaller than said first photo-taking area,
   wherein said photo-taking optical system has a stop, a positive lens disposed between said stop and an object, an air spacing being adjacent to said positive lens being varied during the changeover between said first mode and said trimming mode.

6. An image forming apparatus according to claim 5, wherein said positive lens comprises a cemented lens.

7. An image forming apparatus having at least two modes, comprising:
   means for setting a first mode for a first photo-taking areas of an image plane of a photo-taking optical system; and
   means for setting a trimming mode for a second photo-taking area of the image plane of the photo-taking optical system, said second photo-taking area being smaller than first photo-taking area,
   a negative lens, an air spacing being varied during the changeover between said first mode and said trimming mode and a positive lens, which are disposed in order at a position closer to an object.

* * * * *

UNITED STATES PATENT AND TRADEMARK OFFICE
CERTIFICATE OF CORRECTION

PATENT NO. : 5,392,082

DATED : February 21, 1995

INVENTOR(S) : KEIJI IKEMORI, ET AL.

It is certified that error appears in the above-indentified patent and that said Letters Patent is hereby corrected as shown below:

ON THE COVER PAGE

[56] Foreign Patent Documents

" 5,075,707   12/1991   Ueyama" should read
--5,075,709   12/1991   Ueyama--.

COLUMN 1

Line 6, "on" should read --on--.

COLUMN 3

Line 48, "or" should read --of--.

COLUMN 4

Line 42, "embodiment v" should read --embodiment,--.

UNITED STATES PATENT AND TRADEMARK OFFICE
CERTIFICATE OF CORRECTION

PATENT NO. : 5,392,082
DATED : February 21, 1995
INVENTOR(S) : KEIJI IKEMORI, ET AL.

It is certified that error appears in the above-indentified patent and that said Letters Patent is hereby corrected as shown below:

COLUMN 5

Line 14, "pseudo-telephoto" should read --pseudo-telephoto effect--.

COLUMN 9

Line 25, "$|F1/fA| \geq 2$," should read --$|f1/fA| \geq 2$,--.

Signed and Sealed this

Ninth Day of May, 1995

Attest:

BRUCE LEHMAN

*Attesting Officer*    *Commissioner of Patents and Trademarks*